(12) United States Patent
Kim

(10) Patent No.: US 11,544,003 B2
(45) Date of Patent: Jan. 3, 2023

(54) MEMORY SYSTEM, MEMORY CONTROLLER, AND METHOD OF OPERATING MEMORY SYSTEM

(71) Applicant: SK hynix Inc., Gyeonggi-do (KR)

(72) Inventor: Jung Ae Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 312 days.

(21) Appl. No.: 16/876,288

(22) Filed: May 18, 2020

(65) Prior Publication Data

US 2021/0191653 A1   Jun. 24, 2021

(30) Foreign Application Priority Data

Dec. 20, 2019  (KR) .......................... 10-2019-0171477

(51) Int. Cl.
| | |
|---|---|
| *G06F 3/06* | (2006.01) |
| *G06F 7/58* | (2006.01) |
| *G06F 11/20* | (2006.01) |
| *G06F 11/16* | (2006.01) |
| *G06F 11/10* | (2006.01) |
| *G06F 12/02* | (2006.01) |
| *G06F 21/79* | (2013.01) |
| *G06F 21/64* | (2013.01) |

(52) U.S. Cl.
CPC .......... *G06F 3/0659* (2013.01); *G06F 3/0604* (2013.01); *G06F 3/0673* (2013.01); *G06F 3/0688* (2013.01); *G06F 7/582* (2013.01); *G06F 11/1068* (2013.01); *G06F 11/167* (2013.01); *G06F 11/2017* (2013.01); *G06F 12/0246* (2013.01); *G06F 3/0614* (2013.01); *G06F 3/0658* (2013.01); *G06F 11/1612* (2013.01); *G06F 21/64* (2013.01); *G06F 21/79* (2013.01)

(58) Field of Classification Search
USPC ....................................................... 714/739
See application file for complete search history.

(56) References Cited

U.S. PATENT DOCUMENTS

| | | | |
|---|---|---|---|
| 2006/0248427 A1* | 11/2006 | Katayama ............ | G11B 27/329 |
| 2008/0215798 A1* | 9/2008 | Sharon .................. | G11C 16/10 |
| | | | 711/E12.001 |

(Continued)

FOREIGN PATENT DOCUMENTS

KR   10-2012-0123985   11/2012

OTHER PUBLICATIONS

Qian, "A seismic image horizon tracking method based on signal classification," Feb. 19, 2014 (Year: 2014).*

(Continued)

*Primary Examiner* — Sakinah White Taylor
(74) *Attorney, Agent, or Firm* — IP & T Group LLP

(57) ABSTRACT

Embodiments of the present disclosure relate to a memory system, a memory controller, and a method of operating the memory system. According to the embodiments of the present disclosure, when result data obtained by derandomizing data included in a flag area is different from reference data after a random data unit is derandomized based on a seed, it is possible to detect an error occurring in the seed in a process of derandomizing the data and to prevent malfunction of firmware in advance by searching for a target seed and derandomizing the random data unit based on the target seed.

14 Claims, 15 Drawing Sheets

(56) References Cited

U.S. PATENT DOCUMENTS

| | | | |
|---|---|---|---|
| 2014/0372714 A1* | 12/2014 | Lee .......................... | G06F 7/724 |
| | | | 711/154 |
| 2015/0131880 A1* | 5/2015 | Wang .................... | G06T 3/0075 |
| | | | 382/131 |
| 2016/0350316 A1* | 12/2016 | Cho ....................... | G06F 16/116 |
| 2017/0269998 A1* | 9/2017 | Sunwoo .............. | G06F 11/1068 |

OTHER PUBLICATIONS

Schnizler et al, "Bit error pattern analyzer and method," Sep. 10, 2014 (Year: 2014).*
Senoo, "Data descrambling device and data descrambling method", Sep. 10, 2014 (Year: 2014).*
Zhang et al, "Geological horizon automatic tracking method and device," Jan. 1, 2017 (Year: 2017).*
Liao, "Geological horizon automatic tracking method and device," Mar. 15, 2017 (Year: 2017).*

\* cited by examiner

*FIG.11*

| BIT_SET | {0,1} | {2} | {0,1,2} | {0} | {1} | {1,2} | {0,1} | ... | select BIT_SET : {0,1} -> {2} -> {0, 1, 2} -> {0} -> {1} -> {1, 2} -> {0, 1} ...

FIG.12

| BIT_SET | {0,1} | {2} | {0,1,2} | {0} | {1} | {1,2} | {0,2} | ··· | select BIT_SET : {2} -> {0} -> {1} -> {0,1} -> {1,2} -> {0,2} -> {0,1,2} -> ...

MEMORY SYSTEM, MEMORY CONTROLLER, AND METHOD OF OPERATING MEMORY SYSTEM

CROSS REFERENCE TO RELATED APPLICATION

The present application claims priority under 35 U.S.C. 119(a) to Korean patent application number 10-2019-0171477 filed on Dec. 20, 2019, which is incorporated herein by reference in its entirety.

BACKGROUND

1. Field of the Invention

Embodiments of the present disclosure relate to a memory system, a memory controller, and a method of operating the memory system.

2. Description of the Prior Art

A memory system which corresponds to a storage device a device configured to store data on the basis of a request from a host, such as a computer, a mobile terminal (for example, a smartphone or a tablet), or various other electronic devices. The memory system may include not only a device configured to store data in a magnetic disk such as a hard disk drive (HDD), but also a device configured to store data in a nonvolatile memory such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute or control operations for reading, writing, or erasing data in a volatile memory or a nonvolatile memory included in the memory system. The memory controller may drive firmware for performing a logical operation for controlling such operations.

Meanwhile, when writing data to the memory device, the memory system may randomize the data using a predetermined seed value and may then store the randomized data in the memory device. Therefore, the memory system must derandomize the data read from the memory device before use.

SUMMARY

Various embodiments of the present disclosure may provide a memory system, a memory controller, and a method of operating the memory system, which can detect an error occurring in a seed in a process of derandomizing data.

In addition, embodiments of the present disclosure may provide a memory system, a memory controller, and a method of operating the memory system, which can prevent malfunction of firmware in advance.

According to one aspect, embodiments of the present disclosure may provide a memory system including a memory device and a memory controller for controlling the memory device. The memory controller may derandomize a random data unit in which randomized data is included based on the seed. The memory controller may compare, with reference data having a fixed value, first result data obtained by derandomizing data included in a flag area of the random data unit based on the seed.

When the first result data is different from the reference data, the memory controller may search for a target seed for derandomizing the random data unit again. In this case, second result data obtained by derandomizing the data included in the flag area based on the target seed may be the same as the reference data.

The memory controller may derandomize the random data unit based on the target seed.

The memory controller may search for the target seed by repeatedly performing a first operation including: correcting a value of one of the bits of the seed to generate a first-corrected seed and then derandomizing the random data unit based on the first-corrected seed.

When failing to find the target seed through the repetitive first operation, the memory controller may search for the target seed by repeatedly performing a second operation including: correcting a value of one reference bit among the bits of the seed, correcting a value of one bit among remaining bits except the reference bit among the bits of the seed thereby generating a second corrected seed, and derandomizing the random data unit based on the second corrected seed.

The memory controller may search for the target seed by repeatedly performing a third operation including: selecting one of a predetermined plurality of bit sets, correcting a value of the bit included in the selected bit set to generate a third corrected seed, the bit being one among the bits of the seed, and derandomizing the random data unit based on the third corrected seed.

In this case, the memory controller may select the bit set based on a number of bits included in each of the plurality of bit sets.

According to another aspect, embodiments of the present disclosure may provide a memory interface configured to communicate with a memory device and a memory controller including a control circuit for controlling the memory device.

The control circuit may derandomize a random data unit in which randomized data is included, based on a seed.

The control circuit may compare, with reference data having a fixed value, first result data obtained by derandomizing data included in a flag area of the random data unit based on the seed.

When the first result data is different from the reference data, the control circuit may search for a target seed for derandomizing the random data unit. In this case, second result data obtained by derandomizing the data included in the flag area based on the target seed may be the same as the reference data.

The control circuit may derandomize the random data unit based on the target seed.

The control circuit may search for the target seed by repeatedly performing a first operation including: correcting a value of one bit of the bits of the seed to generate a first-corrected seed and derandomizing the random data unit based on the first-corrected seed.

When failing to find the target seed through the repetitive first operation, the control circuit may search for the target seed repeatedly by performing a second operation including: correcting a value of one reference bit among the bits of the seed, correcting a value of one bit among the remaining bits except the reference bit among the bits of the seed thereby generating a second corrected seed, and derandomizing the random data unit based on the second corrected seed.

The control circuit may search for the target seed by repeatedly performing a third operation including: selecting one of a predetermined plurality of bit sets, correcting a value of the bit included in the selected bit set to generate a third corrected seed, the bit being one among the bits of the seed, and derandomizing the random data unit based on the third corrected seed.

In this case, the control circuit may select the bit set based on a number of bits included in each of the plurality of bit sets.

A method of operating a memory system may include derandomizing a random data unit in which randomized data is included, based on a seed.

The method of operating the memory system may include comparing, with reference data having a fixed value, first result data obtained by derandomizing data included in a flag area of the random data unit based on the seed.

When the first result data is different from the reference data, the method of operating the memory system may include searching for a target seed for derandomizing the random data unit again. In this case, second result data obtained by derandomizing the data included in the flag area based on the seed may be the same as the reference data.

An operating method of derandomizing device may include firstly derandomizing, through a seed code, randomized data into which original data including a fixed value is randomized through the seed code and performing, when a result of the firstly derandomizing does not include the fixed value, an iteration of: flipping one or more bits of the seed code and secondly derandomizing the randomized data through the bit-flipped code.

The iteration continues until a result of the secondly derandomizing is the same as the fixed value.

The method of operating the memory system may include derandomizing the random data unit based on the target seed.

According to embodiments of the present disclosure, it is possible to detect an error occurring in a seed in a process of derandomizing data.

In addition, according to embodiments of the present disclosure, it is possible to prevent malfunction of firmware in advance.

BRIEF DESCRIPTION OF THE DRAWINGS

The above and other aspects, features and advantages of the present disclosure will become apparent from the following detailed description taken in conjunction with the accompanying drawings.

FIG. 11 is a diagram illustrating an example in which a memory system selects one of a plurality of bit sets according to embodiments of the present disclosure.

FIG. 12 is a diagram illustrating another example in which a memory system selects one of a plurality of bit sets according to embodiments of the present disclosure.

DETAILED DESCRIPTION

Hereinafter, embodiments of the present disclosure will be described in detail with reference to the accompanying drawings.

Figure 1:
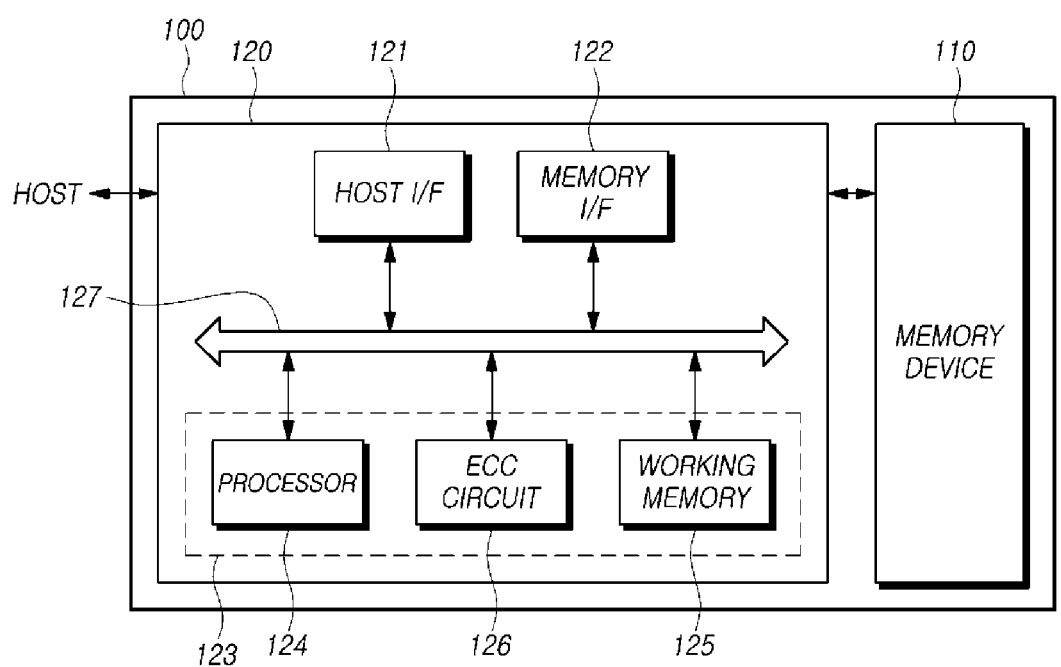
FIG. 1 is a diagram illustrating a schematic configuration of a memory system according to an embodiment of the present disclosure.

FIG. 1 is a diagram illustrating the schematic configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation"), an erasure operation, and the like.

The memory device 110 may include a memory cell array including multiple memory cells (also simply referred to as "cells") configured to store data. The memory cell array may exist inside a memory block.

For example, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array selected using the address. That is, the memory device 110 may perform an operation corresponding to the received command in a memory area of the memory device having a physical address corresponding to the received address from the controller.

For example, the memory device 110 may perform a program operation, a read operation, an erasure operation, and the like. During the program operation, the memory device 110 may program data in the area selected by the address. During the read operation, the memory device 110 may read data from the area selected by the address. During the erasure operation, the memory device 110 may erase data stored in the area selected by the address.

The memory controller 120 may control write (program), read, erasure, and background operations with regard to the memory device 110. The background operation may include, for example, at least one among a garbage collection operation (GC), a wear leveling (WL) operation, and a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device.

The memory controller 120 and the host may be separate devices. In some cases, the memory controller 120 and the host may be integrated and implemented as a single device. In the following description, the memory controller 120 and the host are separate devices.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control the operation of the memory device 110 by performing operations for an overall control of the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, according to the mapping unit. Typical address mapping methods may include a page mapping method, a block mapping method, and a hybrid mapping method.

The processor 124 may be configured to randomize data received from the host. For example, the processor 124 may randomize data received from the host by using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program executed inside the memory system 100, and may include various functional layers.

For example, the firmware may include at least one of a flash translation layer (FTL) configured to translate between a logical address that the host HOST requests the memory system 100 to provide and a physical address of the memory device 110, a host interface layer (HIL) configured to interpret a command that the host HOST issues to the memory system 100 (storage device) and to deliver the same to the FTL, and a flash interface layer (FIL) configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect an error bit of check target data by using an error correction code, and to correct the detected error bit. For example, the check target data may be data stored in the working memory 125, data retrieved from the memory device 110, or the like.

The error detection/correction circuit 126 may be implemented to decode data by using the error correction code. The error detection/correction circuit 126 may be implemented by using various code decoders. For example, a decoder that performs nonsystematic code decoding or a decoder that performs systematic code decoding may be used.

For example, the error detection/correction circuit 126 may detect an error bit, sector by sector, with regard to each piece of read data. That is, each piece of read data may include multiple sectors. As used herein, a sector may refer to a data unit smaller than the read unit (page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector included in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various types of control signals and commands, and a data bus for delivering various types of data.

The above-mentioned constituent elements 121, 122, 124, 125, and 126 of the memory controller 120 are only provided as examples. It is noted that some of the above-mentioned constituent elements 121, 122, 124, 125, and 126 of the memory controller 120 may be omitted, or some of the above-mentioned constituent elements 121, 122, 124, 125, and 126 of the memory controller 120 may be integrated into a single element. In addition, in some cases, one or more other constituent elements may be added, in addition to the above-mentioned constituent elements of the memory controller 120.

Hereinafter, the memory device 110 will be described in more detail with reference to FIG. 2.

Figure 2:
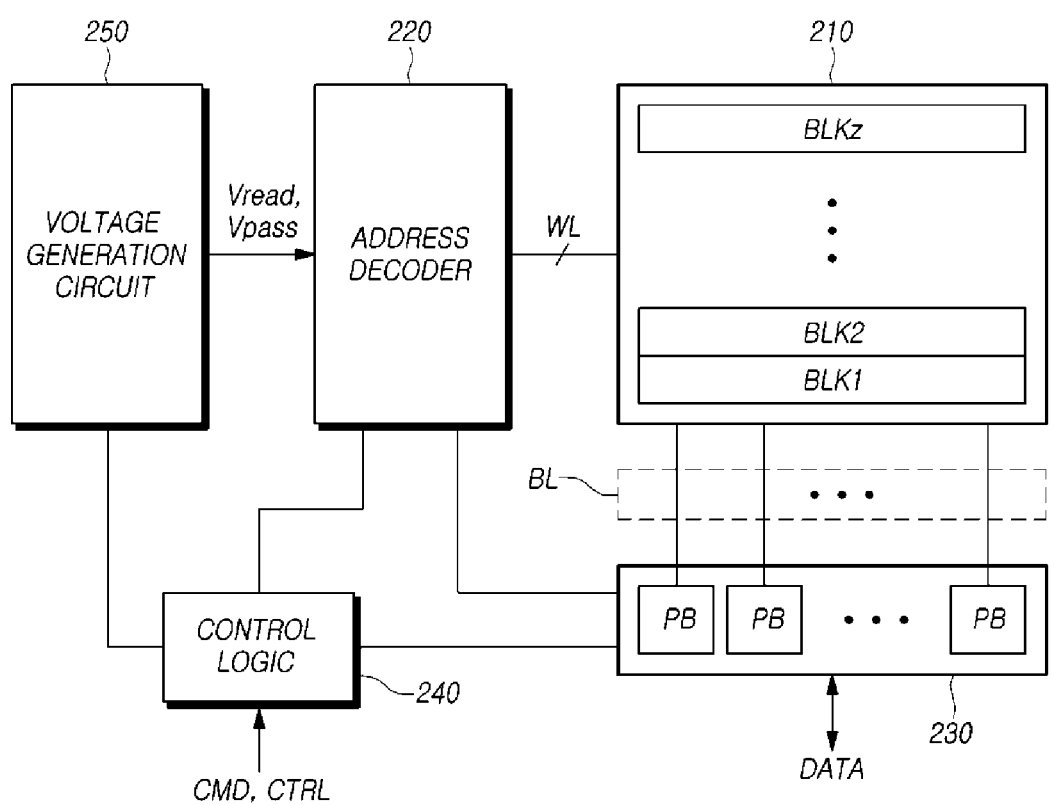
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 according to an embodiment of the present disclosure may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data. As another example, each of the multiple memory cells included in the memory cell array 210 may be a triple-level cell (TLC) configured to store three bits of data. As another example, each of the multiple memory cells included in the memory cell array 210 may be a quad-level cell (QLC) configured to store four bits of data. As another example, the memory cell array 210 may include multiple memory cells, each of which may be configured to store at least five bits of data.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

The address decoder 250 may apply the read voltage Vread to a selected word line WL inside a selected memory block, when applying the read voltage during a read operation, and may apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that is in charge of a data processing function and, in some cases, may further include a cache buffer in charge of a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
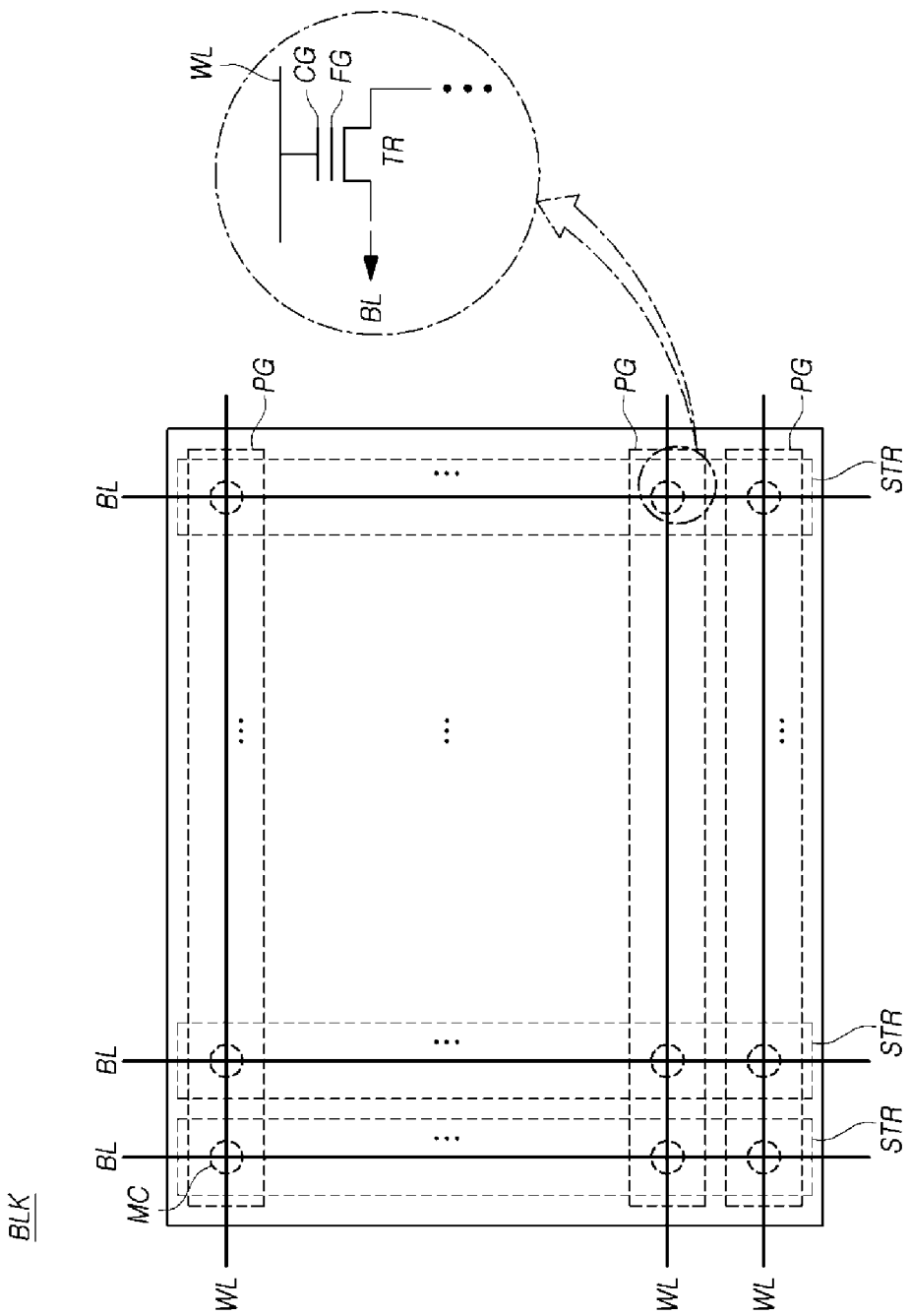
FIG. 3 is a diagram schematically illustrating a memory block of a memory device according to an embodiment of the present disclosure.

FIG. 3 is a diagram schematically illustrating a memory block BLK of a memory device 110 according to an embodiment of the present disclosure.

Referring to FIG. 3, a memory block BLK included in the memory device 110 may be arranged and configured in such direction that multiple pages PG and multiple strings TTR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, at least one dummy word line may be additionally arranged between the second outermost word line and the second selection line.

In the case of a memory block structure as illustrated in FIG. 3, a read operation and a program operation (write operation) may be performed page by page, and an erasure operation may be performed memory block by memory block.

Figure 4:
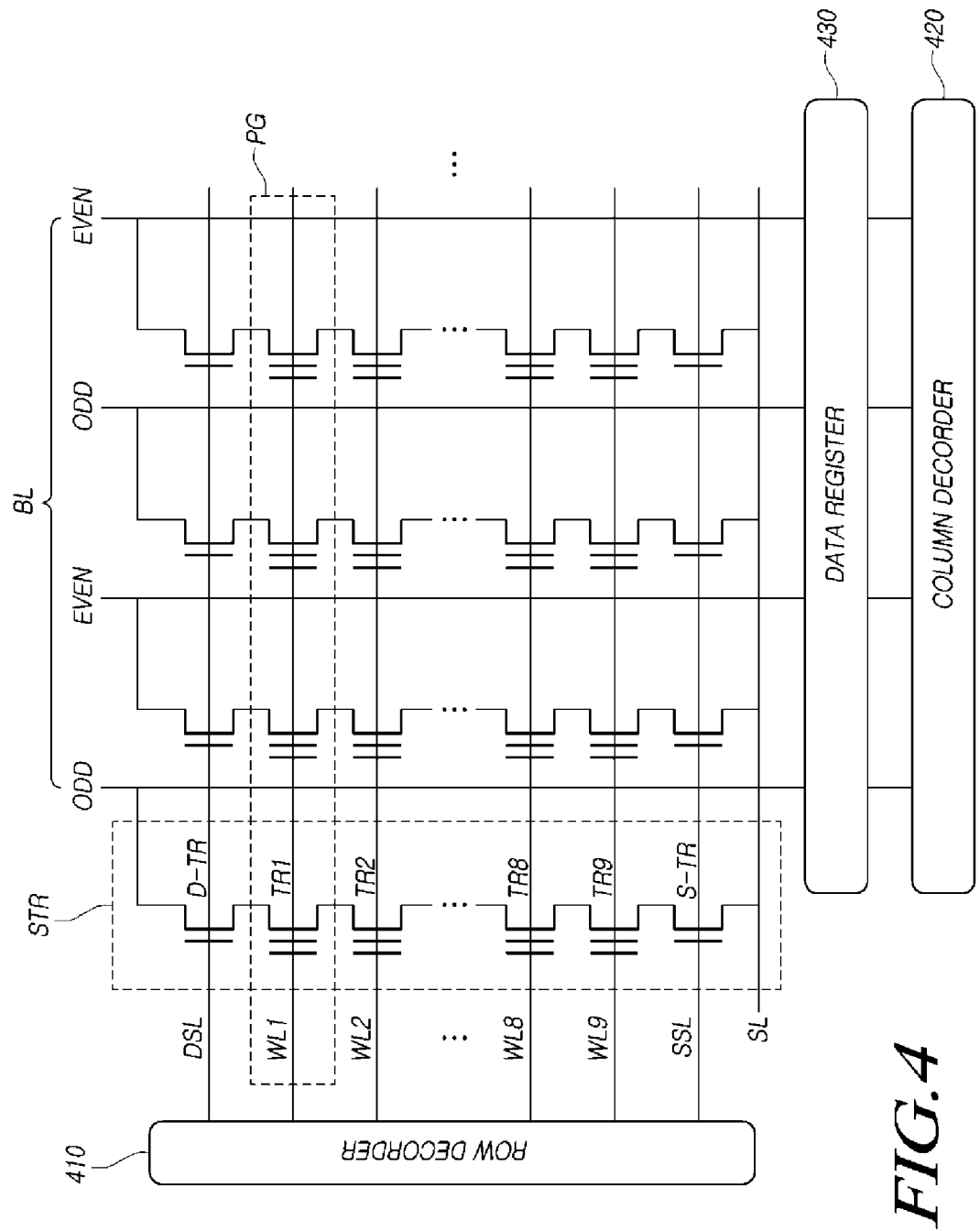
FIG. 4 is a diagram illustrating a structure of word lines and bit lines of a memory device according to an embodiment of the present disclosure.

FIG. 4 is a diagram illustrating a structure of word lines WL and bit lines BL of a memory device 110 according to an embodiment of the present disclosure.

Referring to FIG. 4, the memory device 110 has a core area in which memory cells MC are concentrated, and an auxiliary area which corresponds to the remaining area other than the core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. When each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL may be connected to the column decoder 420 while being distinguished between odd-numbered bit lines BL and even-numbered bit lines BL.

For accessing a memory cell MC, the address may be entered to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC in the middle position or last position among memory cells MC connected in series may slightly differ from the voltage applied to the memory cell MC in the first position and from the voltage applied to the memory cell MC in the last position, due to the voltage drop across the preceding memory cell MC.

The data register 430 plays an essential role because all data processing by the memory device 110, including program and read operations, occurs via the data register 430. If data processing by the data register 430 is delayed, all of the other areas need to wait until the data register 430 finishes the data processing. In addition, degradation of performance of the data register 430 may degrade the overall performance of the memory device 110.

Referring to the example illustrated in FIG. 4, in one string STR, multiple transistors TR1-TR9 may be connected to multiple word lines WL1-WL9. The multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned on both ends of the corresponding string STR and deliver/block signals.

During a program operation, the memory system 100 fills the target memory cell MC of the bit line BL which is to be programmed with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may supply a predetermined voltage (for example, +20V) to the substrate through a source line SL during an erasure operation. The memory system 100 floats both the first selection transistor D-TR and the second selection transistor S-TR during an erasure operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
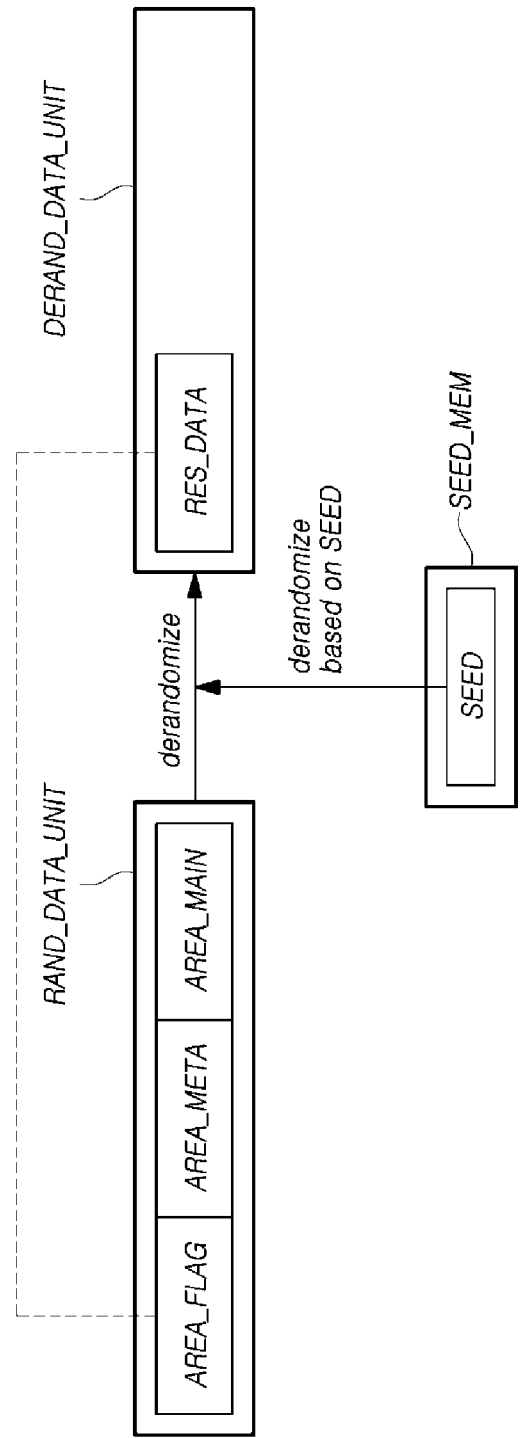
FIG. 5 is a diagram illustrating an operation in which a memory system according to embodiments of the present disclosure derandomizes a random data unit.

FIG. 5 is a diagram illustrating an operation in which the memory system 100 according to embodiments of the present disclosure derandomizes a random data unit RAND_DATA_UNIT.

The memory controller 120 of the memory system 100 may derandomize a random data unit RAND_DATA_UNIT read from the memory device 110 to generate the derandomized data unit DERAND_DATA_UNIT.

Data randomized by the processor 124 of the memory controller 120 described with reference to FIG. 1 may be included in the random data unit RAND_DATA_UNIT. The size of the random data unit RAND_DATA_UNIT may be a predetermined value (e.g., 2 KB).

When derandomizing the random data unit RAND_DATA_UNIT, the memory controller 120 may derandomize the random data unit RAND_DATA_UNIT based on a predetermined seed.

The size of the predetermined seed SEED may be a predetermined value (e.g., 4 Byte). Meanwhile, the seed SEED used to derandomize the random data unit RAND_DATA_UNIT may also be used when the processor 124 of the memory controller 120 derandomizes data received from a host HOST.

The seed SEED may be stored in a seed memory SEED_MEM inside the memory system 100. The seed memory SEED_MEM may be a volatile memory (e.g., SRAM).

If the seed memory SEED_MEM is the volatile memory, the seed SEED stored in the seed memory SEED_MEM may be deleted when the memory system 100 enters a sleep state. Accordingly, the seed SEED may be copied from nonvolatile memory (e.g. the memory device 110, ROM, PROM, EPROM) to the seed memory SEED_MEM whenever the memory system 100 wakes up from the sleep state. The random data unit RAND_DATA_UNIT may include a plurality of areas divided based on a type of data to be stored.

First, the random data unit RAND_DATA_UNIT may include a flag area AREA_FLAG. The flag area AREA_FLAG is an area in which result data obtained by randomizing a fixed flag value (e.g., 0xFFFFFFFF) is included. In the memory system 100, the random data unit RAND_DATA_UNIT may always store the result data obtained by randomizing the fixed flag value, in the flag area AREA_FLAG. Accordingly, the result data RES_DATA obtained by derandomizing the flag area AREA_FLAG based on the seed SEED, which is not damaged, is always the fixed flag value.

The random data unit RAND_DATA_UNIT may include a meta area AREA_META. The meta area AREA_META is an area in which results obtained by randomizing meta data (e.g., mapping information between a logical address and a physical address, a read count about a memory block, retention information of data stored in the memory block, etc.) are stored.

The random data unit RAND_DATA_UNIT may include a main area AREA_MAIN. The main area AREA_MAIN is an area in which results obtained by randomizing user data are stored.

In the embodiments of the present disclosure, the memory system 100 may determine whether an error occurs in the seed SEED using the result data RES_DATA obtained by derandomizing the flag area AREA_FLAG among areas included in the random data unit RAND_DATA_UNIT. In this case, the fact that the error occurs in the seed SEED means that a bit flip occurs on one or more bits of bits of the seed SEED so that the value of the seed SEED is changed.

The reason for determining whether an error has occurred in the seed SEED using the result obtained by derandomizing a specific area included in the random data unit RAND_DATA_UNIT is as follows.

As described above, the seed SEED is included in the seed memory SEED_MEM. The seed SEED may be copied from the memory device 110 to the seed memory SEED_MEM when the memory system 100 boots or wakes up from the sleep state. In this process, an error due to a bit flip may occur. In addition, as the state of the seed memory SEED_MEM deteriorates over time, an error may occur in the seed SEED.

If an error occurs in the seed SEED, an error may also occur in the result obtained by derandomizing the random data unit RAND_DATA_UNIT. Therefore, firmware that is driven using the result obtained by derandomizing the random data unit RAND_DATA_UNIT may malfunction in the memory system 100.

However, the error of the seed SEED is not an error of data that is randomized and stored in the memory device 110. Accordingly, there is a problem that the memory controller 120 cannot detect an error of the seed SEED through ECC.

Therefore, in the embodiments of the present disclosure, the memory system 100 may detect an error of the seed SEED based on the result obtained by derandomizing the random data unit RAND_DATA_UNIT to prevent malfunction of the firmware.

At this time, it is not possible to detect the error of the seed SEED based on a portion that can be randomly changed. Therefore, the memory system 100 may detect the error of the seed SEED using the flag area AREA_FLAG including the fixed flag value (e.g., 0xFFFFFFFF), which is supposed to be unchanged as far as the seed SEED is not damaged, by derandomizing the random data unit RAND_DATA_UNIT based on the seed SEED.

Hereinafter, in the embodiments of the present disclosure, an operation in which the memory system 100 determines whether an error occurs in the seed SEED by using the result obtained by derandomizing the flag area AREA_FLAG will be described.

Figure 6:
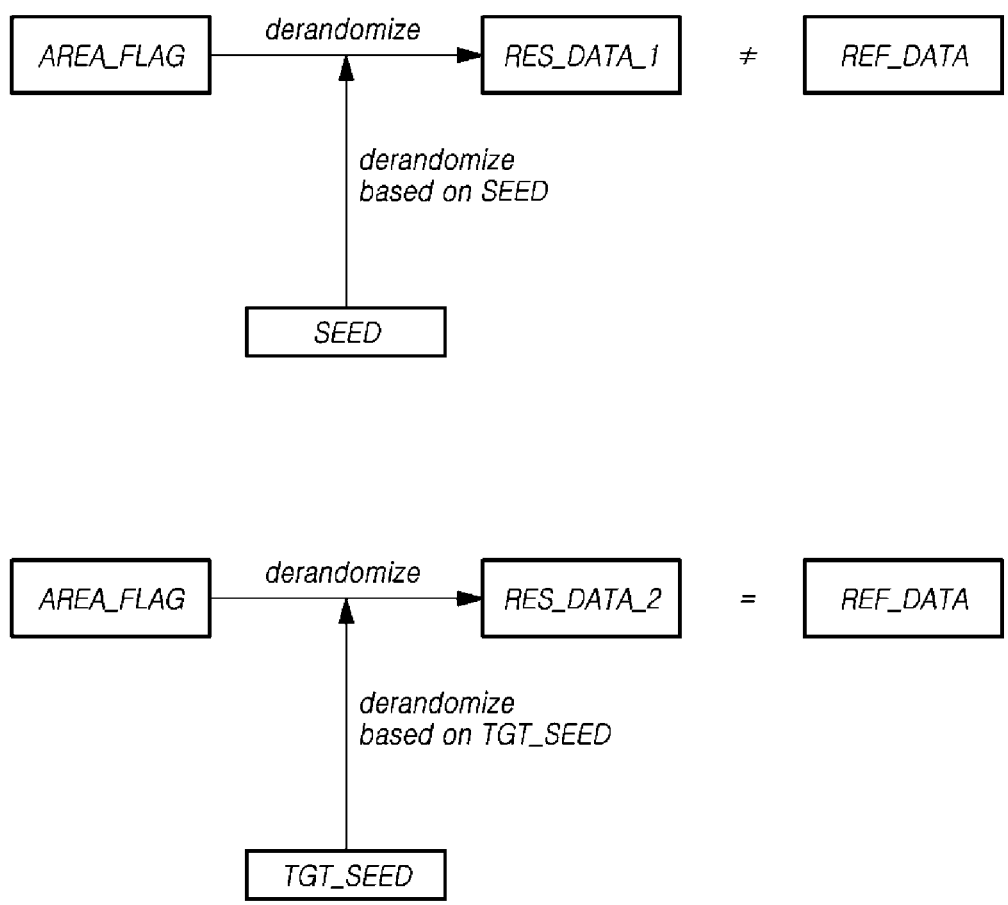
FIG. 6 is a diagram illustrating an operation in which a memory system according to embodiments of the present disclosure compares, with reference data, result data obtained by derandomizing data included in a flag area.

FIG. 6 is a diagram illustrating an operation in which the memory system 100 according to embodiments of the present disclosure compares, with reference data REF_DATA, result data obtained by derandomizing data included in a flag area AREA_1.

The memory controller 120 of the memory system 100 may compare, with reference data REF_DATA, a first result data RES_DATA_1 obtained by derandomizing data included in the flag area AREA_FLAG of the random data unit RANDOM_DATA_UNIT based on the seed SEED. At this time, the reference data REF_DATA may have the fixed flag value (e.g., 0xFFFFFFFF). The reference data REF_DATA may be the same as the result data obtained by derandomizing the data included in the flag area AREA_FLAG when there is no error in the seed SEED.

As described above, the result data RES_DATA obtained by derandomizing the flag area AREA_FLAG of the random data unit RAND_DATA_UNIT based on the seed SEED should always include the fixed flag value when the seed SEED is not damaged. Therefore, if there is no error in the seed SEED used during the derandomization, the first result data RES_DATA_1 is equal to the reference data REF_DATA.

If the first result data RES_DATA_1 is different from the reference data REF_DATA, the memory controller 120 may determine that an error has occurred in the seed SEED.

The target seed TGT_SEED is used to derandomize the random data unit RAND_DATA_UNIT without an error. Second result data RES_DATA_2, obtained by derandomizing the data included in the flag area AREA_FLAG based on the target seed TGT_SEED, is the same as the reference data REF_DATA. Therefore, the memory controller 120 may search for the target seed TGT_SEED based on whether the result data obtained by derandomizing the data included in the flag area AREA_FLAG based on a corrected seed, which will be described later, is the same as the reference data REF_DATA.

If successful in searching for the target seed TGT_SEED, the memory controller 120 may derandomize the random data unit RAND_DATA_UNIT based on the target seed TGT_SEED. Next, the memory controller 120 may update the seed SEED used in a subsequent derandomization operation to the target seed TGT_SEED.

Hereinafter, the operations of the memory system 100 described with reference to FIGS. 5 and 6 will be described through the corresponding flowchart.

Figure 7:
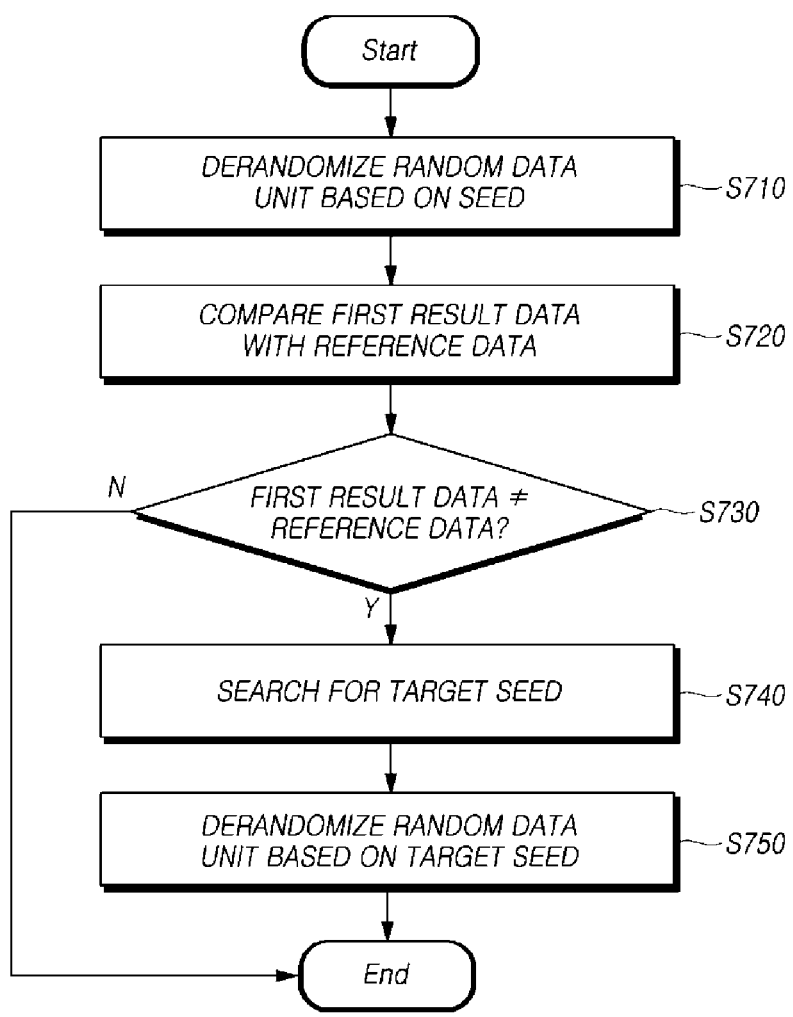
FIG. 7 is a flowchart illustrating an operation of a memory system according to embodiments of the present disclosure.

FIG. 7 is a flowchart illustrating schematic operations of the memory system 100 according to embodiments of the present disclosure.

Referring to FIG. 7, in operation S710, the memory controller 120 of the memory system 100 may derandomize a random data unit RAND_DATA_UNIT in which randomized data is included, based on a seed SEED.

In operation S720, the memory controller 120 may compare, with reference data REF_DATA, first result data RES_DATA_1 obtained by derandomizing data included in a flag area AREA_FLAG included in the random data unit RAND_DATA_UNIT based on the seed SEED. In operation S730, the memory controller 120 may determine whether the first result data RES_DATA_1 is different from the reference data REF_DATA.

When the first result data RES_DATA_1 is different from the reference data REF_DATA (S730-Y), in operation S740, the memory controller 120 may search for a target seed TGT_SEED for derandomizing the random data unit RAND_DATA_UNIT again. In operation S750, the memory controller 120 may derandomize the random data unit RAND_DATA_UNIT based on the target seed TGT_SEED searched for in operation S740.

On the other hand, when the first result data RES_DATA_1 is the same as the reference data REF_DATA (S730-N), this means that there is no error in the seed SEED. Accordingly, the memory controller 120 may not perform the operation of searching for the target seed TGT_SEED.

Hereinafter, an example of the operation in which the memory system 100 searches for the target seed TGT_SEED in operation 740 will be described through the corresponding flowchart.

Figure 8:
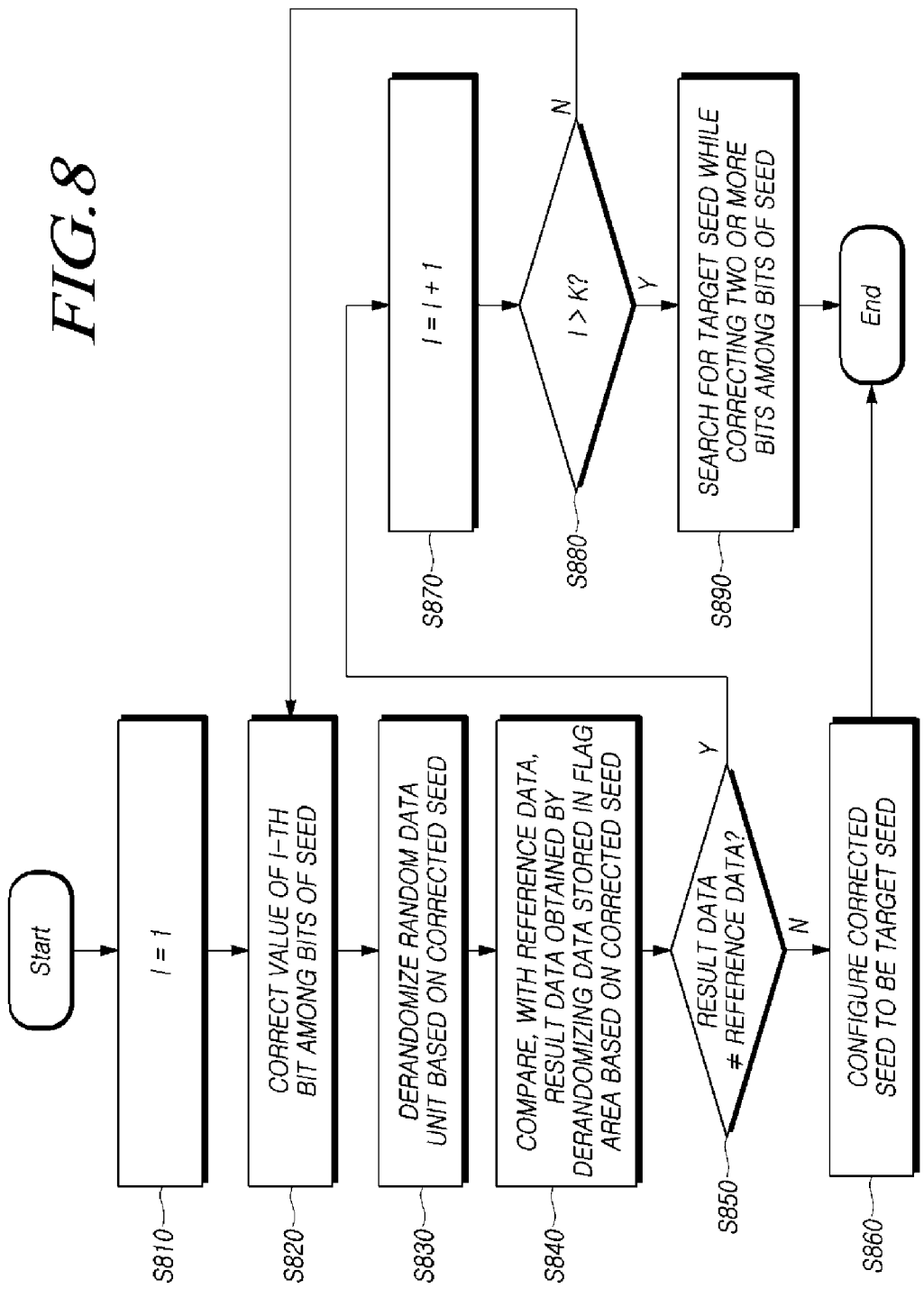
FIG. 8 is a flowchart illustrating an example of an operation in which a memory system searches for a target seed according to embodiments of the present disclosure.

FIG. 8 is a flowchart illustrating an example of an operation in which the memory system 100 searches for the target seed TGT_SEED according to embodiments of the present disclosure.

In FIG. 8, the memory controller 120 of the memory system 100 may repeatedly perform, in order to search for the target seed TGT_SEED, an operation of correcting a value of one bit of the bits of the seed SEED to generate a corrected seed and derandomizing the random data unit RAND_DATA_UNIT based on the corrected seed. The reason for correcting only the value of one bit of the bits of the seed SEED in this manner is that the likelihood of an error occurring only in the one bit among the bits of the seed SEED is significantly higher than the likelihood of an error occurring in a plurality of bits among the bits of the seed SEED.

First, in operation S810, the memory controller 120 may configure a value of I indicating a bit for correcting a value to be 1. In this case, I is a value for indicating an I-th bit among the bits of the seed SEED.

A method of determining which of the bits of the seed SEED is the I-th bit may be variously determined.

Hereinafter, in the embodiments of the present disclosure, the I-th bit is determined in ascending order from the smallest index value among the bits of the seed SEED. For example, if the bits of the seed SEED are 32 bits from index 0 to index 31 based on the least significant bit (LSB), a bit having index 0 may be determined as a first bit, a bit having index 1 may be determined as a second bit, a bit having index 2 may be determined as a third bit, and . . . , a bit having index 31 may be determined as a 32nd bit. However, unlike this, a method of determining the I-th bit in descending order from the largest index value (a bit having index 31 is a first bit, a bit having index 30 is a second bit, . . . , and a bit having index 0 is a 32nd bit) may also be used.

In operation S820, the memory controller 120 may correct the value of the I-th bit among the bits of the seed SEED.

Since I=1 is configured in operation S810, the memory controller 120 may correct a value of the first bit (the bit having index 0) among the bits of the seed SEED.

For example, the bits of the seed SEED are 32 bits and the value of the seed SEED is 0x7E2D753F (=0b01111110001011010111010100111111).

In this case, the value of the first bit (bit having index 0) of the seed SEED is 1 (0xF=0b1111). Therefore, if the value of the first bit of the seed SEED is corrected from 1 to 0, the value of the seed SEED may become 0x7E2D753E (0xE=0b1110).

In operation 830, the memory controller 120 may derandomize the random data unit RAND_DATA_UNIT based on the corrected seed SEED of operation S820. For example, when the seed is corrected from 0x7E2D753F to 0x7E2D753E in operation S820, the memory controller 120 may perform derandomization based on 0x7E2D753E which is the corrected seed SEED.

In operation S840, the memory controller 120 may compare, with reference data REF_DATA, result data obtained by derandomizing the flag area AREA_FLAG based on the corrected seed SEED. In operation 850, the memory controller 120 may determine whether the result data is different from the reference data REF_DATA.

When the result data is the same as the reference data REF_DATA (S850-N), this means that the corrected seed value is the target seed TGT_SEED. Accordingly, in operation S860, the memory controller 120 may configure the corrected seed SEED to be the target seed TGT_SEED.

On the other hand, when the result data is different from the reference data REF_DATA (S850-Y), the memory controller 120 may re-search for the target seed TGT_SEED by correcting a bit different from the I-th bit among the bits of the seed SEED.

First, in operation S870, the memory controller 120 may increase the value of I by 1 to correct the bit different from the I-th bit. In operation S880, the memory controller 120 may determine whether the value of I is larger than K (e.g., K is 32 if the number of bits of the seed SEED is 32 bits), which is the total number of the bits of the seed SEED.

When the value of I is equal to or less than K (S880-N), the memory controller 120 may move to operation S820 to perform the operation of searching for the target seed TGT_SEED again. For example, when a value obtained by correcting a value of the first bit (bit having index 0) of the seed SEED is not the target seed TGT_SEED, the memory controller 120 may identify whether a value obtained by correcting a value of the second bit (bit having index 1) of the seed SEED is the target seed TGT_SEED.

On the other hand, when the value of I is greater than K (S880-Y), this means that the memory controller 120 has failed to search for the target seed TGT_SEED as a result of correcting all of the bits of the seed SEED one by one. This means that not only one bit of the bits of the seed SEED has an error but two or more bits of the bits of the seed SEED have an error. Therefore, in operation S890, the memory controller 120 may search for the target seed TGT_SEED while correcting two or more bits among the bits of the seed SEED.

Hereinafter, in FIGS. 9 and 10, an example of an operation in which the memory controller 120 searches for the target seed TGT_SEED by correcting two bits in operation S890 when failing to search for the target seed TGT_SEED by correcting one bit among the bits of the seed SEED will be described.

Figure 9:
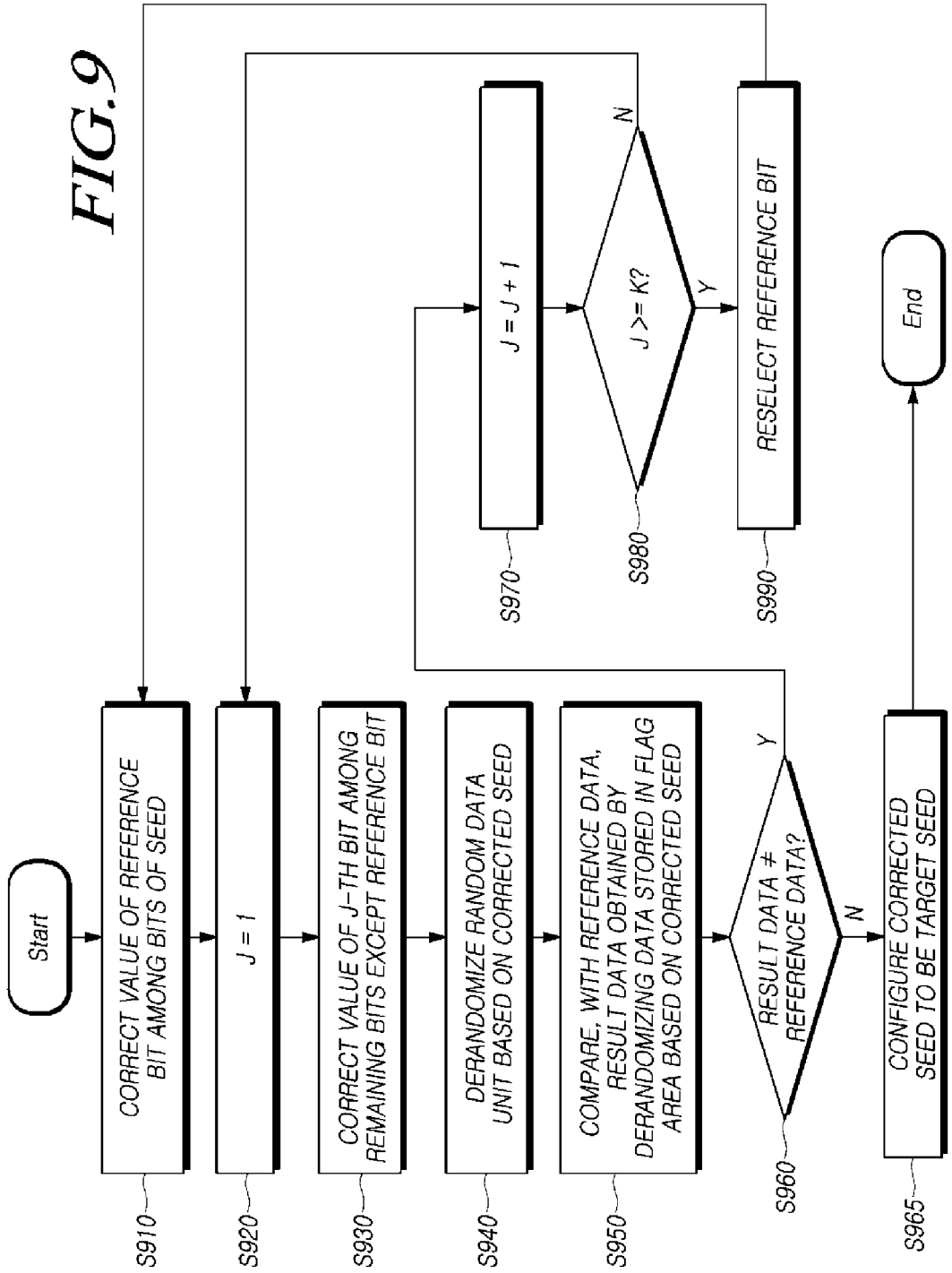
FIG. 9 is a flowchart illustrating another example of an operation in which a memory system searches for a target seed according to embodiments of the present disclosure.

FIG. 9 is a flowchart illustrating another example of an operation in which the memory system 100 searches for the target seed TGT_SEED according to embodiments of the present disclosure.

First, in operation S910, the memory controller 120 may correct a value of a reference bit among the bits of the seed SEED.

For example, the value of the seed SEED is 0x7E2D753F and the reference bit is the first bit (bit having index 0). In this case, the controller 120 may correct the value of the seed SEED to 0x7E2D753E by correcting the value of the first bit from 1 to 0.

Meanwhile, the memory controller 120 may determine the reference bit in various ways.

For example, the memory controller 120 may randomly select the reference bit from the bits of the seed SEED. By way of another example, the memory controller 120 may sequentially select the reference bits (e.g. bit having index 0->bit having index 1->bit having index 2 . . . ).

By way of another example, the memory controller 120 may determine the reference bit based on history information including error occurrence information about the seed SEED.

The history information may include information indicating how many errors have occurred in which bit of the bits of the seed SEED. The memory controller 120 may determine, as the reference bit, a bit most likely to cause an error among the bits of the seed SEED based on the history information. The history information may be stored in the memory device 110 to be maintained even in a power off or sleep state.

For example, the history information may indicate that three errors have occurred in the first bit of the bits of the seed SEED, five errors have occurred in the second bit thereof, one error has occurred in the third bit thereof, and no error has occurred in the fourth bit thereof. In this case, the memory controller 120 may determine the second bit having the highest frequency of occurrence of an error as the reference bit based on the history information.

After the reference bit is determined, the memory controller 120 may repeatedly perform an operation of correcting a value of one bit of the remaining bits except the reference bit among the bits of the seed SEED to generate a corrected seed and then derandomizing the random data unit RAND_DATA_UNIT based on the corrected seed.

In operation S920, the memory controller 120 may configure J to be 1, which is a value indicating the one bit of the remaining bits except the reference bit among the bits of the seed SEED.

In operation S930, the memory controller 120 may correct a value of a J-th bit among the (K−1) remaining bits except the reference bit among K bits constituting the seed SEED. That is, the memory controller 120 may correct the value of the reference bit together with the value of the one bit of the remaining bits except the reference bit.

For example, the number (K) of the bits constituting the seed SEED may satisfy K=32, the reference bit may be a first bit (bit having index 0), and J=1. In this case, the memory controller 120 may correct the value of the first bit (bit having index 1) of the 31 remaining bits except the reference bit together with the value of the reference bit.

By way of another example, the number (K) of the bits constituting the seed SEED may satisfy K=32, the reference bit may be a fourth bit (bit having index 3), and J=5. In this case, the memory controller 120 may correct the value of the fifth bit (bit having index 5) of the remaining bits except the reference bit together with the value of the reference bit.

Hereinafter, in FIG. 10, an example in which the memory controller 120 corrects the value of the reference bit together with the value of one bit of the remaining bits except the reference bit will be described.

In operation S940, the memory controller 120 may derandomize the random data unit RAND_DATA_UNIT based on the seed SEED corrected in operation S930.

In operation S950, the memory controller 120 may compare, with the reference data REF_DATA, result data obtained by derandomizing the flag area AREA_FLAG based on the corrected seed SEED. In operation S960 the memory controller 120 may determine whether the result data is different from the reference data REF_DATA.

When the result data is the same as the reference data REF_DATA (S960-N), this means that the corrected seed value is the target seed TGT_SEED. Accordingly, in operation S965, the memory controller 120 may configure the corrected seed SEED to be the target seed TGT_SEED.

On the other hand, when the result data is different from the reference data REF_DATA (S960-Y), the memory controller 120 may re-search for the target seed TGT_SEED by correcting another bit among the remaining bits except the reference bit.

First, in operation S970, the memory controller 120 may increase a value of J by 1 to correct another bit among the remaining bits except the reference bit. In operation S980, the memory controller 120 may determine whether the value of J is equal to or greater than the K remaining bits except the reference bit among K bits constituting the seed SEED.

When the value of J is less than K (S980-N), the memory controller 120 may repeat operation S920 to search for the target seed TGT_SEED again. For example, when the seed obtained by correcting the value of the reference bit (bit having index 2) among the bits of the seed SEED and a value of the second bit (bit having index 1) among the remaining bits except the reference bit is not the target seed TGT_SEED, the memory controller 120 may identify whether the seed SEED obtained by correcting the reference bit (bit having index 2) and a value of the third bit (bit having index 3) among the remaining bits except the reference bit is the target seed TGT_SEED.

On the other hand, when the value of J is greater than or equal to K (S980-Y), this means that the memory controller 120 has failed to search for the target seed TGT_SEED by correcting the value of the reference bit among the bits of the seed SEED and the value of any one of the remaining bits except the reference bit.

Accordingly, the memory controller 120 may re-select a currently configured reference bit in operation S990, and may perform operation S910.

At this time, the memory controller 120 may reselect the reference bit in various ways. For example, as described above, the memory controller 120 may randomly select the reference bit among the bits of the seed SEED or may sequentially select the reference bits.

By way of another example, the memory controller 120 may reselect the reference bit based on history information including error occurrence information about the seed SEED.

For example, the history information indicates that three errors have occurred in the first bit of the bits of the seed SEED, five errors have occurred in the second bit thereof, one error has occurred in the third bit thereof, and no error has occurred in the fourth bit thereof. In this case, the memory controller 120 may reselect, as the reference bit, the first bit having the highest frequency of occurrence of an error among the remaining bits except the reference bit based on the history information.

Figure 10:
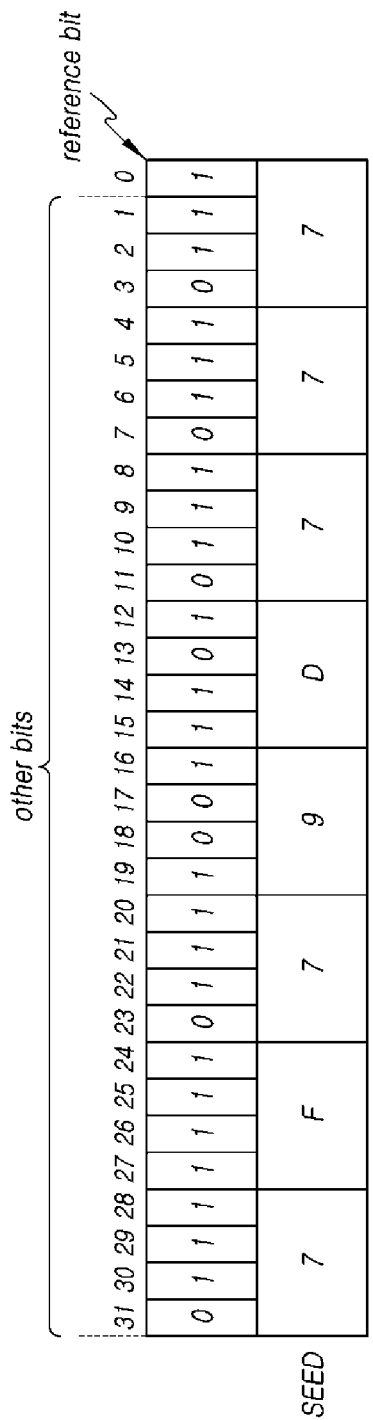
FIG. 10 is a diagram illustrating an example in which the memory system of FIG. 9 sequentially corrects seed values to search for a target seed.

FIG. 10 is a diagram illustrating an example in which the memory system 100 in FIG. 9 sequentially corrects the seed values to search for the target seed TGT_SEED.

In FIG. 10, the seed SEED has 32 bits and a value of 0x7F79D777 (=0b01111111011110011101011101110111). In addition, it is assumed that the reference bit has an index 0.

The memory controller 120 of the memory system 100 may correct a bit value of a bit having index 0, that is, the reference bit among the bits of the seed SEED and a bit value of a bit having index 1, that is, the first bit of the remaining bits except the reference bit. In this case, since the value of the bit having index 0 is corrected to 0 and the value of the bit having index 1 is corrected to 0, the value of the corrected seed SEED becomes 0x7F79D774 (=0b01111111011110011101011101110100).

When 0x7F79D774 which is the corrected seed SEED is not the target seed TGT_SEED, the memory controller 120 may correct the bit having index 0 which is the reference bit among the values of the seed SEED and the bit having index 0 which is the second bit among the remaining bits except the reference bit. In this case, since the value of the bit having index 0 is 0 and the value of the bit having Index 2 is 0, the value of the corrected SEED becomes 0x7F79D772 (=0b01111111011110011101011101110010).

When 0x7F79D772 which is the corrected seed SEED is also not the target seed TGT_SEED, the memory controller 120 may correct the value of the bit having index 0, that is, the reference bit among the bits of the seed SEED and the value of the bit having index 3, that is, the third bit among the remaining bits except the reference bit. In this case, since the value of the bit having index 0 is 0 and the value of the bit having index 3 is 1, the value of the corrected seed SEED becomes 0x7F79D77E (=0b01111111011110011101011101111110).

In the above-described pattern, the memory controller 120 may search for the target seed TGT_SEED while sequentially correcting the seed values.

As described above, in FIGS. 7 to 10, the operation in which the memory system 100 searches for the target seed TGT_SEED while sequentially correcting one or two or more bits of the bits of the seed SEED has been described.

Hereinafter, an operation in which the memory system 100 selects one of a plurality of bit sets BIT_SET and searches for the target seed TGT_SEED while correcting a value of a bit included in the selected bit set from the seed SEED will be described.

In this case, a method of determining the plurality of bit sets BIT_SET by the memory system 100 may be variously determined.

For example, the memory system 100 may determine the plurality of bit sets BIT_SET by using possible combinations of the bits of the seed SEED. If the number of the bits of the seed SEED is three (bits having indexes 0, 1 and 2), the plurality of bit sets BIT_SET may be determined as {0}, {1}, {2}, {0,1}, {0,2}, {1,2}, and {0,1,2} which are possible combinations of 0, 1, and 2.

By way of another example, the memory system 100 may determine the plurality of bit sets BIT_SET by using possible combinations of the reference bit and the remaining bits except the reference bit among the bits of the seed SEED. If the number of the bits of the seed SEED is three (bits having indexes 0, 1, and 2) and the reference bit is the bit having index 1, the plurality of bit sets BIT_SET may be determined as {1}, {0,1}, {1,2}, and {0,1,2} including the bit having index 1.

Hereinafter, an embodiment in which the memory system 100 selects one of a plurality of determined bit sets BIT_SET will be described.

FIG. 11 is a diagram illustrating an example in which the memory system 100 according to embodiments of the present disclosure selects one of a plurality of bit sets BIT_SET.

For example, when the plurality of bit sets BIT_SET are {0,1}, {2}, {0,1,2}, {0}, {1}, {1,2}, {0,1} ..., the memory controller 120 of the memory system 100 may search for the target seed TGT_SEED while sequentially selecting one of the plurality of bit sets BIT_SET.

First, the memory controller 102 may select the bit set {0,1}. Next, the memory controller 120 may correct a bit value of a bit having index 0 and a bit value of a bit having index 1 which are included in the bit set {0,1} from the seed SEED, and may then derandomize the random data unit RAND_DATA_UNIT, thereby identifying whether the corrected seed SEED is the target seed TGT_SEED.

When the corrected seed is not the target seed TGT_SEED, the memory controller 120 may select the next bit set {2}. Next, the memory controller 120 may correct a bit value of a bit having index 2 included in the bit set {2} from the seed SEED, and may then derandomize the random data unit RAND_DATA_UNIT, thereby identifying whether the corrected seed is the target seed TGT_SEED.

When the corrected seed SEED is not the target seed TGT_SEED, the memory controller 120 may select the next bit set {0, 1,2}. Next, the memory controller 120 may correct values of a bit having index 0, a bit of having index 1, and a bit having index 2 which are bits included in the bit set {0,1,2} from the seed SEED, and may then derandomize the random data unit RAND_DATA_UNIT, thereby identifying whether the corrected seed SEED is the target seed TGT_SEED.

In this pattern, the memory controller 120 may select one of the plurality of bit sets BIT_SET, may correct the seed SEED based on the selected bit set, and may then derandomize the random data unit RAND_DATA_UNIT, thereby identifying whether the corrected seed SEED is the target seed TGT_SEED.

In FIG. 11, an embodiment in which the memory controller 120 sequentially selects one of the plurality of bit sets BIT_SET has been described.

Hereinafter, an embodiment in which the memory controller 120 selects one of the plurality of bit sets BIT_SET according to a specific condition will be described.

FIG. 12 is a diagram illustrating another example in which the memory system 100 according to embodiments of the present disclosure selects one of the plurality of bit sets BIT_SET.

The memory controller 120 of the memory system 100 may select one of the plurality of bit sets BIT_SET based on the number of bits included in the plurality of bit sets BIT_SET.

In FIG. 12, the memory controller 120 may preferentially select a bit set including a small number of bits among the plurality of bit sets BIT_SET. In this case, the memory controller 120 may select an arbitrary bit set among bit sets having the same number of included bits.

The memory controller 120 may first select a bit set including one bit. The memory controller 120 may sequentially select the bit set {2}, the bit set {0}, and the bit set {1}. Furthermore, the memory controller 120 may select the bit sets in order of {0}->{1}->{2}.

The memory controller 120 may select the bit set including two bits after all the bit sets including one bit are selected. The memory controller 120 may sequentially select the bit set {0,1}, the bit set {1,2}, and the bit set {0,2}.

The memory controller 120 may select the bit set including three bits after the bit set including two bits is selected. The memory controller 120 may select the bit set {0, 1, 2}.

In a case in which the memory controller 120 selects one of the plurality of bit sets BIT_SET as described with reference to FIG. 12, when the plurality of bit sets BIT_SET are stored in a buffer (not illustrated) while in a state of being arranged based on the number of bits included in each bit set, the bit sets may be selected faster. This is because the memory controller 120 sequentially selects the bit sets BIT_SET without having to compare the number of bits included in each bit set.

Figure 13:
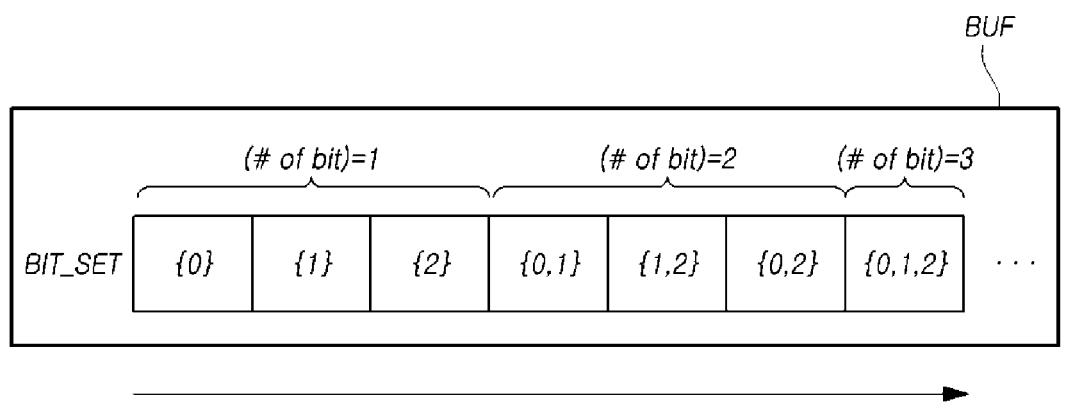
FIG. 13 is a diagram illustrating an example in which a memory system according to embodiments of the present disclosure selects one from a plurality of arranged bit sets.

FIG. 13 is a diagram illustrating an example in which the memory system 100 selects one from a plurality of arranged bit sets BIT_SET according to embodiments of the present disclosure.

Referring to FIG. 13, the plurality of bit sets BIT_SET are stored in a buffer BUF while in a state of being arranged based on the number of bits included in each bit set. First, bit sets {0}, {1}, and {2} including one bit are stored in the buffer BUF, and bit sets {0,1}, {1,2}, {0,2} including two bits are stored in the buffer BUF, and then a bit set {0,1,2} including three bits are stored in the buffer BUF.

The memory controller 120 of the memory system 100 may select the bit sets including one bit in order of {0}->{1}->{2}, may select the bit sets including two bits in order of {0,1}->{1,2}->{0,2}, and may then select a bit set {0,1,2} including three bits, while sequentially searching for the buffer BUF.

Figure 14:
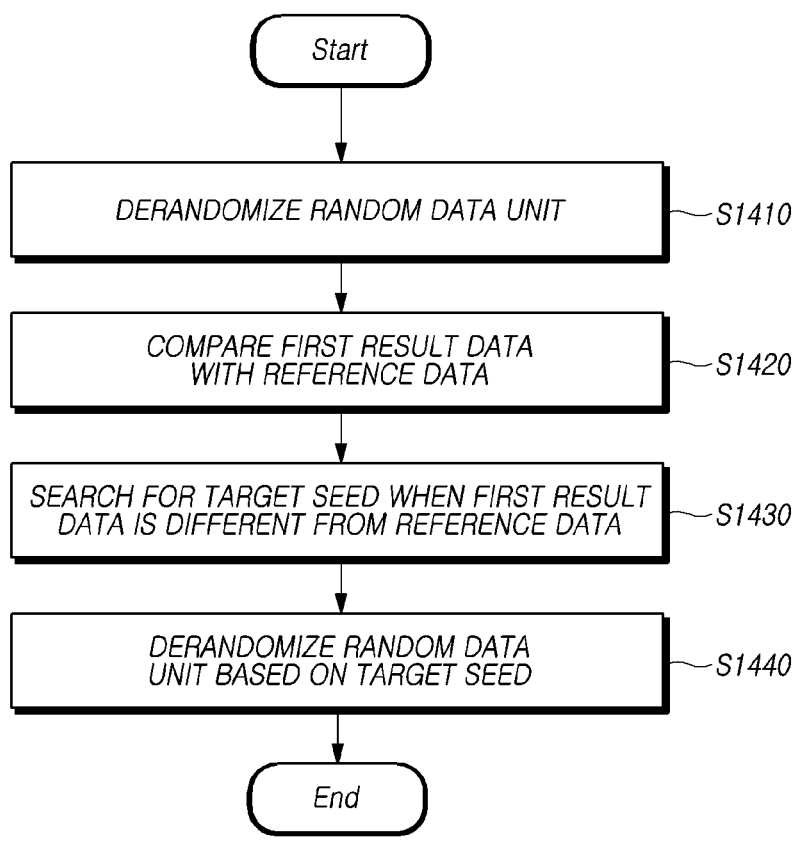
FIG. 14 is a flowchart illustrating a method of operating a memory system according to embodiments of the present disclosure.

FIG. 14 is a flowchart illustrating a method of operating the memory system 100 according to embodiments of the present disclosure.

First, in operation S1410, the method of operating the memory system 100 may include derandomizing a random data unit RAND_DATA_UNIT in which randomized data is included, based on a seed SEED.

In operation S1420, the method of operating the memory system 100 may include comparing, with reference data REF_DATA, first result data RES_DATA_1 obtained by derandomizing data included in a flag area AREA_FLAG of the random data unit RAND_DATA_UNIT based on the seed SEED. At this time, the reference data REF_DATA may have a fixed value.

In operation S1430, the method of operating the memory system 100 may include searching for a target seed TGT_SEED for derandomizing the random data unit RAND_DATA_UNIT again when the first result data RES_DATA_1 is different from the reference data REF_DATA.

In this case, second result data RES_DATA_2 obtained by derandomizing the data included in the flag area AREA_FLAG based on the target seed TGT_SEED may be the same as the reference data REF_DATA.

In operation 1430, the memory system 100 may perform the following operation to search for the target seed TGT_SEED.

For example, the memory system 100 may repeatedly perform an operation of correcting a value of one bit of the bits of the seed SEED to generate a first corrected seed and then derandomizing the random data unit RAND_DATA_UNIT based on the first corrected seed.

When failing to search for the target seed TGT_SEED by correcting the one bit of the bits of the seed SEED, the memory system 100 may first correct a value of one reference bit among the bits of the seed SEED. Next, the memory system 100 may repeatedly perform an operation of correcting a value of one bit among the remaining bits except the reference bit among the bits of the seed SEED to generate a second corrected seed and then derandomizing the random data unit RAND_DATA_UNIT based on the second corrected seed.

By way of another example, the memory system 100 may select one of a predetermined plurality of bit sets BIT_SET. Next, the memory system 100 may repeatedly perform an operation of correcting a value of a bit included in the selected bit set among the bits of the seed SEED to generate a corrected seed and then derandomizing the random data unit RAND_DATA_UNIT based on the corrected seed.

Next, in operation S1440, the method of operating the memory system 100 may include derandomizing the random data unit RAND_DATA_UNIT based on the target seed TGT_SEED.

The above-described operations of the memory controller 120 may be controlled by the control circuit 123, and the processor 124 may perform similar in manner in which various operations of the memory controller 120 execute (drive) programmed firmware.

Figure 15:
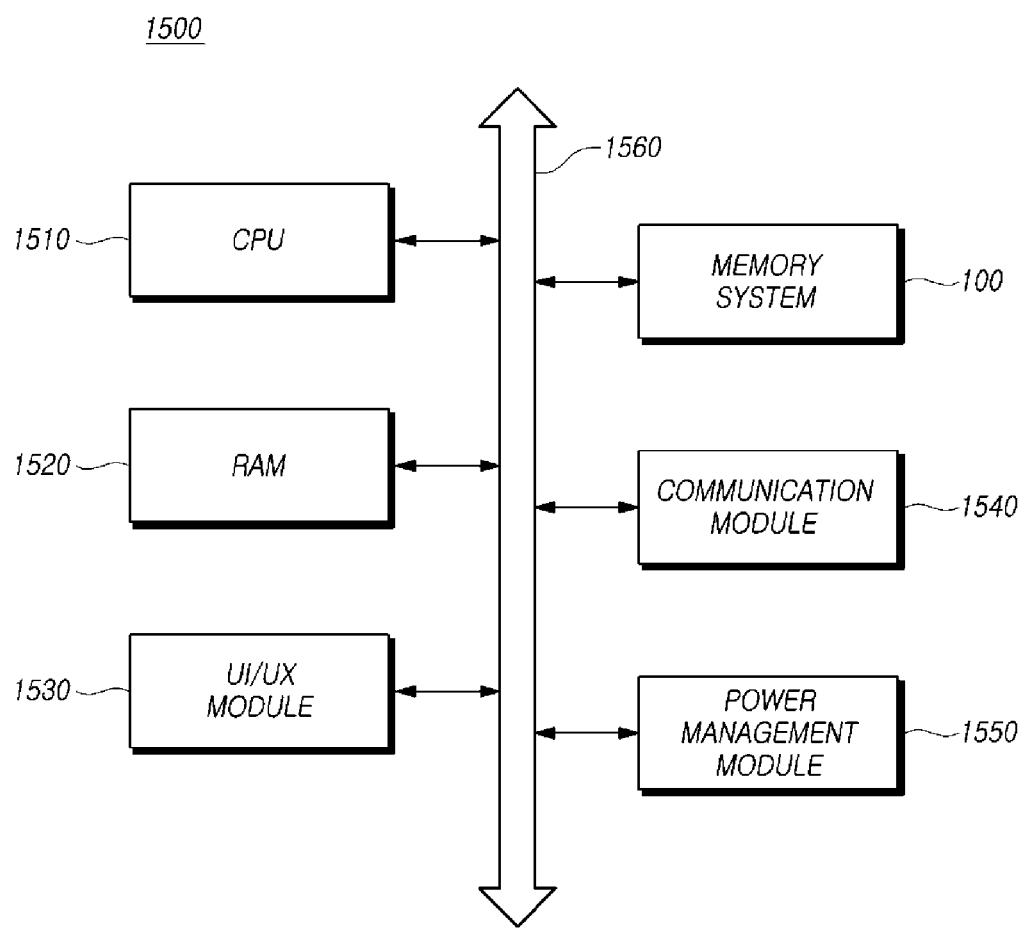
FIG. 15 is a diagram illustrating the configuration of a computing system according to embodiments of the present disclosure.

FIG. 15 is a diagram illustrating the configuration of a computing system 1500 according to an embodiment of the present disclosure.

Referring to FIG. 15, the computing system 1500 according to an embodiment of the present disclosure may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

According to embodiments of the present disclosure described above, the operation delay time of the memory system may be minimized. In addition, according to an embodiment of the present disclosure, an overhead occurring in the process of calling a specific function may be minimized. Although various embodiments of the present disclosure have been described for illustrative purposes, those skilled in the art will appreciate that various modifications, additions and substitutions are possible, without departing from the scope and spirit of the disclosure as disclosed in the accompanying claims. Therefore, embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A memory system comprising:
   a memory device; and
   a memory controller configured to control the memory device,
   wherein the memory controller is further configured to:
   derandomize a random data unit in which randomized data is included, based on a seed,
   compare, with reference data having a fixed value, first result data obtained by derandomizing data included in a flag area of the random data unit based on the seed,
   search for a target seed for derandomizing the random data unit again when the first result data is different from the reference data, and
   derandomize the random data unit based on the target seed,
   wherein the memory controller searches for the target seed by repeatedly performing a first operation including:
   correcting a value of one bit among bits of the seed to generate a first-corrected seed, and
   derandomizing the random data unit based on the first-corrected seed.

2. The memory system of claim 1, wherein the memory controller searches for the target seed, when failing to find the target seed through the repetitive first operation, further by repeatedly performing a second operation including:

correcting a value of one reference bit among the bits of the seed, correcting a value of one bit among remaining bits except the reference bit among the bits of the seed thereby generating a second corrected seed, and derandomizing the random data unit based on the second corrected seed.

3. The memory system of claim 2, wherein the second operation further includes determining the reference bit based on history information including error occurrence information about the seed.

4. The memory system of claim 1, wherein the memory controller searches for the target seed by:

selecting one of a predetermined plurality of bit sets, and repeatedly performing a third operation including:

correcting a value of a bit included in the selected bit set to generate a third corrected seed, the bit is one among the bits of the seed, and derandomizing the random data unit based on the third corrected seed.

5. The memory system of claim 4, wherein the memory controller selects the bit set based on a number of bits included in each of the plurality of bit sets.

6. The memory system of claim 5, wherein the plurality of bit sets are stored in the memory controller while in an arranged state based on the number of the bits included in each of the plurality of bit sets.

7. The memory system of claim 1, wherein the seed is copied from the memory device to a seed memory included in the memory system in response to the memory system waking up from a sleep state.

8. A memory controller comprising:

a memory interface configured to communicate with a memory device; and a control circuit configured to control the memory device, wherein the control circuit is further configured to:

derandomize a random data unit in which randomized data is included, based on a seed, compare, with reference data having a fixed value, first result data obtained by derandomizing data included in a flag area of the random data unit based on the seed, search for a target seed for derandomizing the random data unit again when the first result data is different from the reference data, and derandomize the random data unit based on the target seed, wherein the control circuit searches for the target seed by repeatedly performing a first operation including:

correcting a value of one bit among bits of the seed to generate a first-corrected seed, and derandomizing the random data unit based on the first-corrected seed.

9. The memory controller of claim 8, wherein the memory control circuit searches for the target seed, when failing to find the target seed through the repetitive first operation, further by repeatedly performing a second operation including:

correcting a value of one reference bit among the bits of the seed, correcting a value of one bit among remaining bits except the reference bit among the bits of the seed thereby generating a second corrected seed, and derandomizing the random data unit based on the second corrected seed.

10. The memory controller of claim 8, wherein the control circuit searches for the target seed by:

selecting one of a predetermined plurality of bit sets, and repeatedly performing a third operation including:

correcting a value of a bit included in the selected bit set to generate a third corrected seed, the bit is one among the bits of the seed, and derandomizing the random data unit based on the third corrected seed.

11. The memory controller of claim 10, wherein the control circuit selects the bit set based on a number of bits included in each of the plurality of bit sets.

12. A method of operating a memory system, the method comprising:

derandomizing a random data unit in which randomized data is included, based on a seed, comparing, with reference data having a fixed value, first result data obtained by derandomizing data included in a flag area of the random data unit based on the seed, searching for a target seed for derandomizing the random data unit again when the first result data is different from the reference data, and derandomizing the random data unit based on the target seed, wherein the searching for the target seed comprises repeatedly performing a first operation including:

correcting a value of one bit among bits of the seed to generate a first-corrected seed, and derandomizing the random data unit based on the first-corrected seed.

13. The method of claim 12, wherein the searching for the target seed further comprises when failing to find the target seed through the repetitive first operation, repeatedly performing a second operation including:

correcting a value of one reference bit among the bits of the seed, correcting a value of one bit among remaining bits except the reference bit among the bits of the seed thereby generating a second corrected seed, and derandomizing the random data unit based on the second corrected seed.

14. The method of claim 12, wherein the searching for the target seed comprises:

selecting one of a predetermined plurality of bit sets, and repeatedly performing a third operation including:

correcting a value of a bit included in the selected bit set to generate a third corrected seed, the bit is one among the bits of the seed, and derandomizing the random data unit based on the third corrected seed.

* * * * *